March 11, 1941.　　B. R. REDWOOD　　2,234,778
ONION PLANTER
Filed May 3, 1940　　2 Sheets-Sheet 1
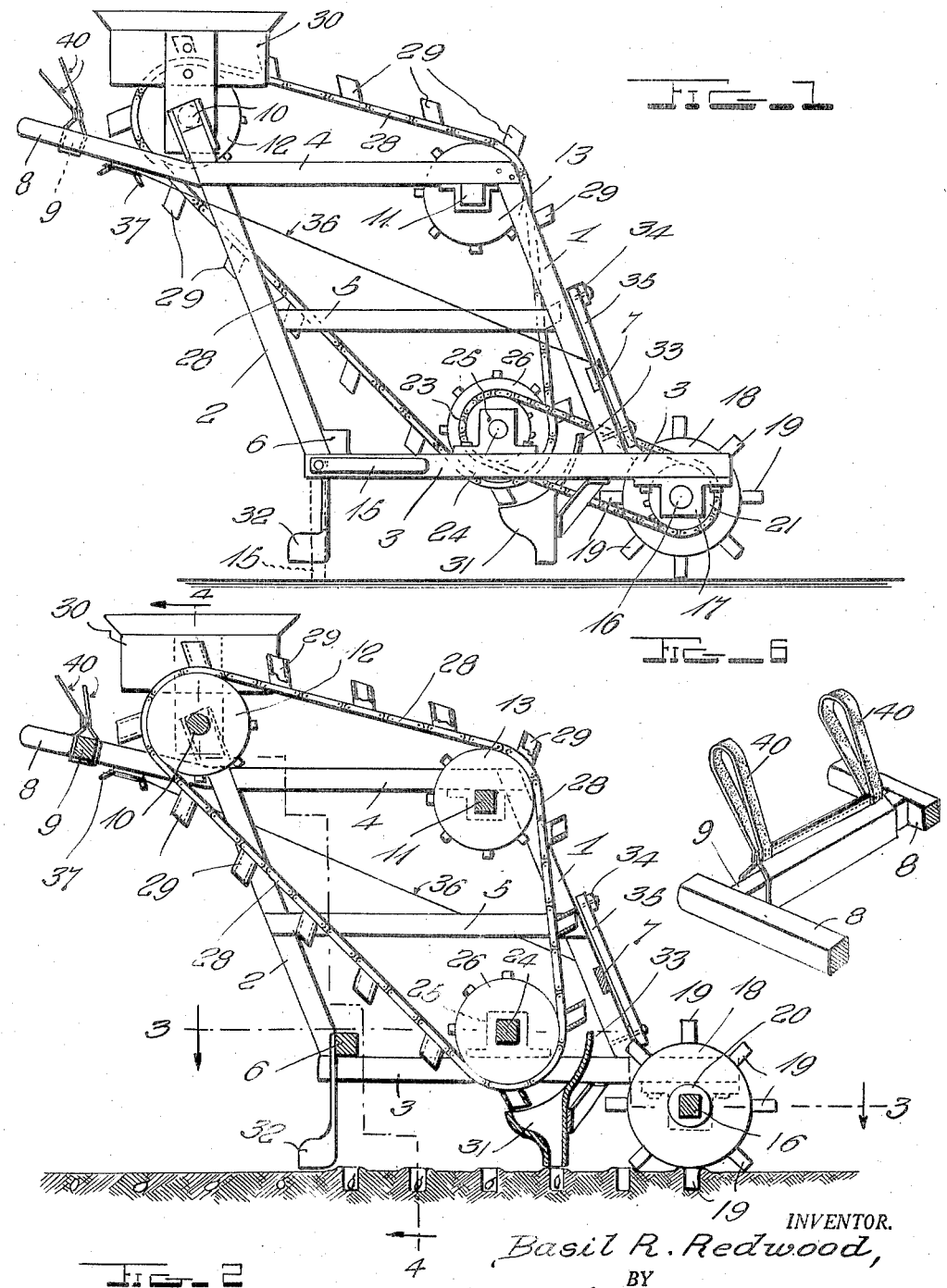
INVENTOR.
Basil R. Redwood,
BY
Ross J. Woodward
Attorney March 11, 1941.    B. R. REDWOOD    2,234,778
ONION PLANTER
Filed May 3, 1940    2 Sheets-Sheet 2
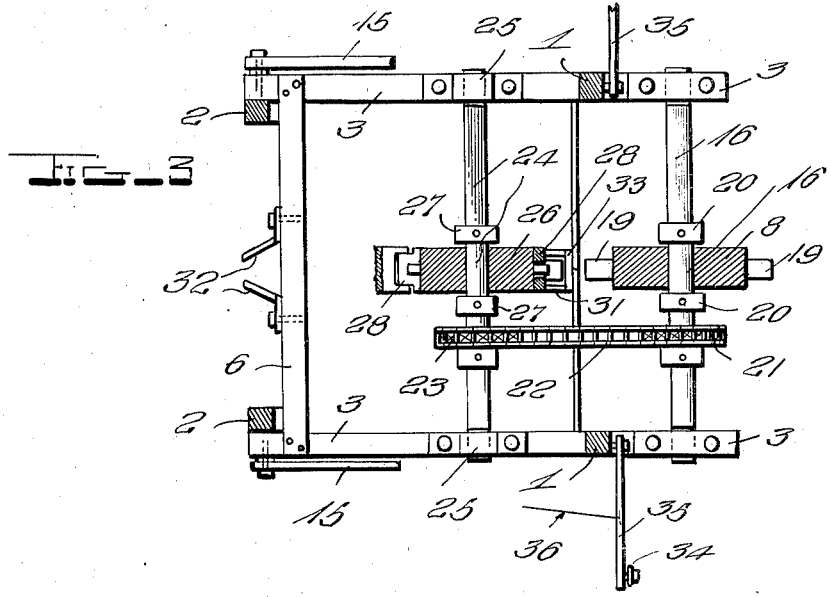
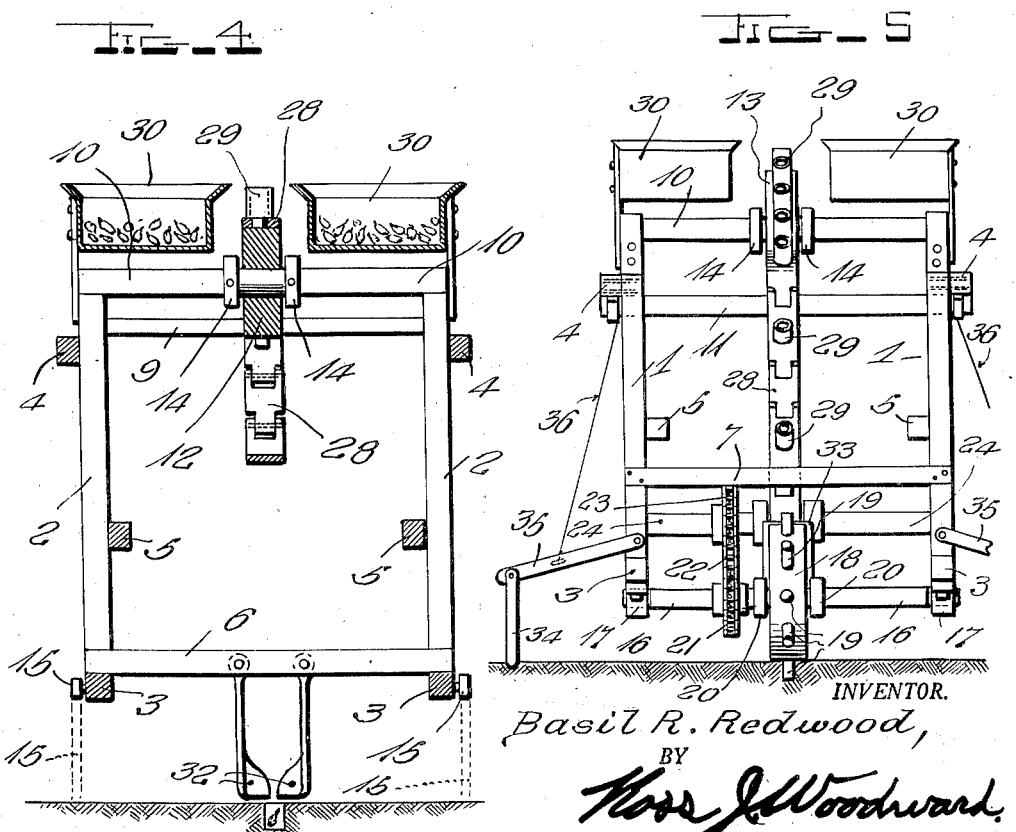
INVENTOR.
Basil R. Redwood,
BY
Ross J. Woodward,
Attorney Patented Mar. 11, 1941

2,234,778

UNITED STATES PATENT OFFICE 2,234,778

ONION PLANTER

Basil R. Redwood, Millville, N. J.

Application May 3, 1940, Serial No. 333,228

5 Claims. (Cl. 111—89)

This invention relates to an agricultural machine and more particularly to a planter, it being one object of the invention to provide a machine of this character by means of which small seeds such as onion seeds may be deposited in the ground during a planting operation.

Another object of the invention is to provide a machine of such construction that it may be pushed across a field and seed deposited in a row at points spaced from each other longitudinally of the row.

Another object of the invention is to provide a planting machine wherein a ground engaging wheel constituting a drive wheel is so formed that as it turns, depressions or seed receiving pits will be formed in the ground in spaced relation to each other longitudinally of a row, the seed being then deposited in the pits and the pits filled in to cover the seed.

Another object of the invention is to provide the machine with seed holding cups carried by a chain or belt trained about sprocket wheels, one of which is mounted on a shaft to which rotary motion is transmitted from driving wheels by means of which seed receiving pits are formed in the ground.

Another object of the invention is to provide the machine with a spout positioned to receive seeds from the seed holding cups and direct the seed into the pits formed in the ground by the driving wheel.

Another object of the invention is to provide a planter of such construction that it may be easily hand-operated and to also provide the machine with supporting legs at its rear, movable to raised position where they will be out of the way when the machine is being propelled forwardly and easily movable to lowered position for engagement with the ground to support the machine when at rest.

Another object of the invention is to provide a planter having markers at opposite sides of its frame so that after a row of seeds has been planted, another or other rows may be planted in parallel spaced relation to each other.

The invention is illustrated in the accompanying drawings, wherein:

Fig. 1 is a side elevation of the planter.

Fig. 2 is a sectional view taken vertically through the planter longitudinally thereof.

Fig. 3 is a sectional view taken horizontally through the planter on the line 3—3 of Fig. 2.

Fig. 4 is a vertical sectional view taken transversely through the planter on the line 4—4 of Fig. 2.

Fig. 5 is a front elevation of the planter.

Fig. 6 is a perspective view of the handles and the shoulder engaging straps.

This improved planter has a frame including in its construction front and rear corner bars 1 and 2 having their lower ends secured against lower side bars 3. Upper side bars 4 extend between upper ends of the corner bars or posts 1 and 2 and bracing bars 5 extend between the corner posts substantially midway the height of the frame. A rear cross bar 6 extends between rear end portions of the lower side bars to which it is secured in front of the rear corner posts to brace the rear portion of the frame and, in order to brace the forward portion of the frame, there has been provided a cross bar or brace 7 extending between and secured to the front posts 1. Handles 8 extend rearwardly from the rear corner posts adjacent rear ends of the upper side bars 4 and carry a cross bar 9 serving as a push bar against which pressure is applied by the operator of the planter for propelling the machine forwardly. There have also been provided upper cross bars 10 and 11, the cross bar 10 being mounted at upper ends of the rear corner posts and the bar 11 being secured to the upper side bars adjacent the front corner posts. These cross bars 10 and 11 constitute braces for the upper portion of the frame and, in addition, serve as stationary axles for toothed rollers 12 and 13 which are rotatably mounted about rounded intermediate portions thereof and held against longitudinal slipping out of their proper positions by collars 14 carried by the bars and secured in set position thereon. Props 15 are pivoted to the lower side bars at the rear ends thereof for swinging adjustment from the raised position shown in Fig. 1, where they will be out of the way during use of the machine, to lowered position for supporting the rear end of the frame when the machine is at rest, as indicated by dotted lines in Fig. 4.

At the front of the frame is a power shaft or drive shaft 16 which is rectangular in cross section for the major portion of its length but has rounded end portions rotatably mounted in bearings 17 carried by front end portions of the lower side bars 3. This shaft carries a ground-engaging drive wheel 18 having lugs 19 projecting from its periphery in spaced relation to each other circumferentially thereof, the lugs being of such length and diameter that, as the machine is propelled forwardly, the lugs will engage the ground to rotate the wheel and the shaft or axle 16 and embed themselves in the ground to form a plurality of pits spaced from each other and adapted to receive seeds which will be deposited therein. Collars 20 are carried by the axle at opposite sides of the wheel 18, to hold the wheel in set position on the axle and prevent the wheel from slipping along the axle out of proper position thereon. The axle also carries a sprocket wheel 21 which turns with the axle and is engaged by a sprocket chain 22 extending rearwardly in the frame and trained about a sprocket wheel 23 mounted on a squared shaft 24 which extends transversely of the frame and has rounded ends which are rotatably mounted in bearings 25 carried by the lower side bars 3. Therefore, rotary motion will be transmitted from the front shaft or axle 16 to the shaft 24 as the machine is pushed forwardly. The axle 24 carries also a toothed roller 26 which turns with the shaft and is held in set position thereon by collars 27 for engagement by a sprocket chain or perforated belt 28 which extends vertically in the frame and is trained about toothed rollers 12 and 13. This chain or endless carrier 28 has mounted thereon a plurality of cups 29 which are mounted filled with seed from the boxes 30 mounted at opposite sides of the frame over the cross bar 10, and from an inspection of Figs. 1 and 2, it will be seen that when the planter is in operation, the cups will be moved forwardly and then downwardly with the endless carrier until they pass around the toothed roller 26 to an inverted position, in which position seed will drop from the cups and into a spout 31 mounted at the bottom of the frame under the roller 26. As the seeds pass through the spout they drop into the pits formed in the ground by the lugs 19. Scraper blades 32 extend downwardly from the rear cross bar 6 and are located back of the spout and wheel 18 so that as the machine is pushed forwardly, these blades will serve to move dirt into the pits and cover the seed deposited therein. By forming the spout 31 with an upwardly extending plate or lip 33 at its front and curving the lip longitudinally, it will serve as a barrier to close the open ends of the cups as the cups move downwardly about the wheel 26. Therefore, the seed will be prevented from dropping out of the cups before the cups reach a position over the spout 31.

The onion seed should be planted in straight rows extending across a field in spaced parallel relation to each other. In order to do this, there have been provided markers 34 carried by arms 35 which are pivoted to the corner posts 1 above the lower side bars 3. The arms are mounted for swinging movement from raised position to lowered position, in which the markers will engage the ground and each arm has attached to it the forward end of a line 36 which extends upwardly and rearwardly along the adjacent side of the frame to a handle with its rear end portion wrapped about a cleat 37 carried by the handle. By pulling upon the line, the arm from which the line extends may be swung to raised position where it will be held when the shortened line is wrapped about the cleat. By loosening the line the arm will swing downwardly and its marker will rest upon the ground and make a mark serving as a guide for the next row. Both markers may be lowered so that one follows a previously planted row and the other forms a guide mark, or one marker may be secured in raised position and the other lowered to ground engaging position.

When the machine is in use the operator stands at the rear and the straps 40 extending upwardly at ends of the sleeve 41 which is secured about the cross bar 9 and engaged over his shoulders so that the straps serve as hangers. The handles 8 extend rearwardly at opposite sides of the operator and since the bar 9 extends across his chest he may apply forward thrust upon the bar and propel the machine forwardly. Since the rear end of the machine is suspended by the straps 40 the operator may use both hands for removing seed from the boxes and placing them into the cups, it being obvious that only one box may be filled with seed if so desired. As the machine is propelled forwardly the drive wheel turns and the lugs form pits in the ground. As the ground wheel turns rotary motion is imparted to the counter shaft and the endless carrier moves in a direction causing the cups to move upwardly to a filling position and then forwardly and downwardly to a dumping position in which seed will be dropped into the spout and from the spout into the pits. The blades or shovels fill in the pits with dirt and cover the seed. The onion seeds are placed in the cups with their roots up and are deposited in the pits with their roots extending downwardly.

Having thus described the invention, what is claimed is:

1. A planter of the character described comprising a frame, a drive shaft rotatably mounted on said frame at the front thereof, a ground engaging drive wheel fixed to said shaft and having lugs extending radially from its periphery in spaced relation to each other circumferentially thereof for engaging the ground and forming a row of spaced seed receiving pits in the ground while turning to rotate the shaft, other shafts carried by said frame transversely thereof, toothed rollers carried by the last mentioned shafts, an endless carrier trained about said rollers and having a portion moving forwardly and downwardly back of the drive wheel as the planter is propelled forwardly, seed containers carried by said carrier and projecting outwardly therefrom and open at their outer ends, a spout back of the drive wheel having a flared upper end portion and disposed in position to receive seed from the containers and deposit the seed in the pits during movement of the carrier as the planter is moved forwardly, the flared upper end of the spout having a portion extending upwardly therefrom in position for engaging across and closing the outer ends of containers as the containers approach a dumping position over the upper end of the spout, and means for transmitting rotary motion to one of the second mentioned shafts from said drive shaft and imparting motion to the carrier as the planter is moved across a field.

2. A planter of the character described comprising a frame, a drive shaft rotatably mounted on said frame at the front thereof, a ground engaging drive wheel fixedly carried by said shaft and having lugs extending from its periphery for engaging the ground and forming seed receiving pits in the ground while turning to rotate the shaft, a countershaft rotatably mounted in said frame back of the drive shaft, a toothed roller fixed to the countershaft, means for transmitting rotary motion from said drive shaft to said countershaft, idler shafts mounted in said frame above and rearwardly of the countershaft, toothed rollers carried by the idler shafts, a sprocket chain trained about the toothed rollers and having movement imparted to it by the toothed roller of the countershaft as the countershaft is rotated, cups carried by said sprocket chain and having open outer ends, a spout mounted in said frame back of the drive wheel in position to receive seed from said cups during movement of the endless carrier and deposit the seed in pits formed in the ground, a tongue extending from the front of the upper end of the spout for extending across and closing the open ends of the cups as the cups approach a dumping position over the spout and means carried by said frame for filling the pits and covering the seed therein during forward movement of the planter.

3. A planter of the character described comprising a frame, a drive shaft rotatably mounted at the front of the frame adjacent the bottom thereof, a ground engaging drive wheel carried by said shaft to turn the same and provided with lugs about its periphery for engaging the ground and forming a row of spaced pits therein as the planter is propelled forwardly, a countershaft rotatably mounted in said frame back of the drive shaft, sprockets carried by the drive shaft and the countershaft, a sprocket chain trained about the sprocket wheels for transmitting rotary motion to the countershaft from the drive shaft, upper shafts carried by said frame adjacent front and rear ends thereof, rollers carried by the countershaft and the upper shafts, the roller of the countershaft turning therewith and the rollers of the upper shafts being loose thereon, an endless carrier trained about said rollers and driven by the roller of the countershaft in a direction to move downwardly back of the drive wheel, cups carried by said carrier and projecting outwardly therefrom with their outer ends open, a seed container carried by said frame in position for transfer of seed from the container to the cups, a spout mounted back of said drive wheel for receiving seed from said cups and depositing seed in pits formed in a row by the lugs of the drive wheel as the planter is propelled forwardly across a field, said spout having a lip projecting upwardly therefrom for closing the open ends of the cups as the cups approach a dumping position over the spout, and shovels carried by the frame back of the countershaft for filling the pits and covering the seed therein.

4. A planter of the character described comprising a frame, a drive shaft rotatably mounted at the front of the frame adjacent the bottom thereof, a ground engaging drive wheel fixed upon said shaft to turn the same and provided with lugs about its periphery for engaging the ground and forming a row of spaced pits therein as the planter is propelled forwardly, a countershaft rotatably mounted in said frame back of the drive shaft, means for transmitting rotary motion from the drive shaft to the countershaft, an endless carrier mounted in the frame back of the drive wheel and driven from the countershaft in a direction for movement of a portion of the carrier downwardly back of the drive wheel, cups carried by said carrier, a spout mounted in the frame back of the drive wheel in position to receive seed from said cups, a tongue extending upwardly from the spout to close the outer ends of the cups as the cups approach the spout, and a handle structure carried by and extending rearwardly from said frame.

5. In a planter of the character described, a frame having corner posts at opposite sides of its front and rear, upper and lower side bars extending between and secured to said posts, a rear cross bar extending between the lower side bars in front of the rear corner posts, a drive shaft rotatably mounted between front ends of the lower side bars in front of lower ends of the front corner posts, a drive wheel carried by said drive shaft and having lugs about its periphery for forming a row of spaced pits in the ground as the planter is propelled forwardly across a field, a countershaft rotatably mounted between the lower side bars intermediate front and rear ends of the frame, means for transmitting rotary motion from the drive shaft to the countershaft, front and rear idler shafts extending transversely in the upper portion of the frame and carried by the upper side bars and upper ends of the rear posts respectively, a driving roller carried by and turning with the countershaft, idler rollers carried by the idler shafts, an endless carrier trained about said rollers and having a portion moving downwardly back of the drive wheel when the carrier is in motion, seed cups carried by said carrier and projecting outwardly therefrom and open at their outer ends, a spout mounted back of the drive wheel for receiving seed from said cups and depositing the seed in pits formed in the ground by the lugs of the drive wheel as the planter is propelled forwardly, shovels carried by the rear cross bar and extending downwardly for engaging the ground and covering seeds deposited in the pits, and a handle structure carried by the rear corner posts and projecting rearwardly from the frame.

BASIL R. REDWOOD.